Aug. 1, 1933.   W. D. HADLEY   1,920,503
STRUCTURAL GLASS FOR COVERING WALLS AND CEILINGS
Filed Dec. 2, 1931   2 Sheets-Sheet 1

Inventor
Willis D. Hadley
by Rippey & Kingsland
His Attorneys.

Aug. 1, 1933.     W. D. HADLEY     1,920,503
STRUCTURAL GLASS FOR COVERING WALLS AND CEILINGS
Filed Dec. 2, 1931     2 Sheets-Sheet 2
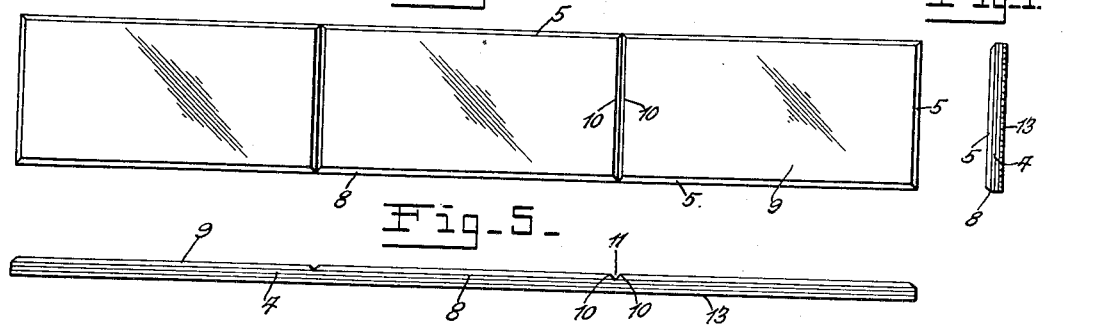
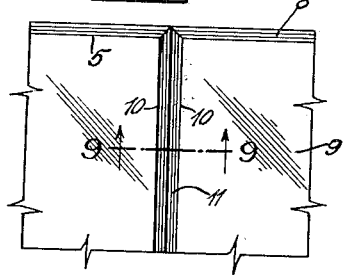
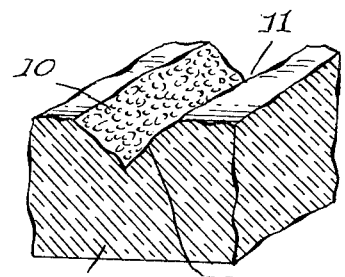
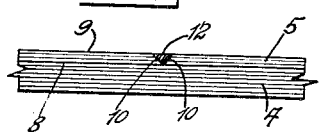
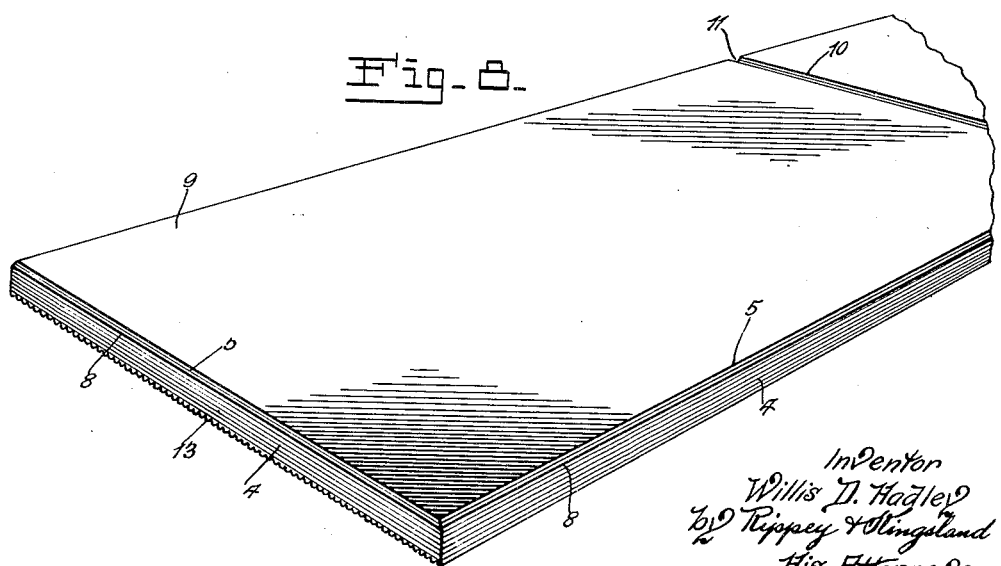
Inventor
Willis D. Hadley
by Rippey & Kingsland
His Attorneys.

Patented Aug. 1, 1933

1,920,503

UNITED STATES PATENT OFFICE 1,920,503

STRUCTURAL GLASS FOR COVERING WALLS AND CEILINGS

Willis D. Hadley, St. Louis, Mo.

Application December 2, 1931. Serial No. 578,499

3 Claims. (Cl. 72—18)

This invention relates to a new type of structural glass for use in covering walls and ceilings, whether said walls be interior or exterior; and it also relates to the method of preparing structural glass plates, after the glass plates have been annealed in the original manufacture thereof, and also to the actual installation of the structural glass, as a result of, or incident to, the new method of preparing the structural glass plates for the walls and ceilings.

Objects of the invention are to provide a more efficient and perfect means of seaming the edges of structural glass plates prior to installation thereof; to reduce the labor cost of installing the structural glass plates on walls and ceilings; and to provide a faster, more accurate, sanitary, and mechanical installation, together with a more desirable and pleasing design effect on the completion of the work.

In the practice of this invention, the surfaces of the structural glass plates of convenient sizes, after having been thoroughly annealed in the course of manufacture, are incised to produce inclined porous walls extending into the bodies of the plates, and the outer corners of the plates are also formed with inclined porous walls. The porosity of these inclined walls formed by incising the glass plates after said plates have been thoroughly annealed in the manufacture thereof is an essential feature of this invention, because said walls are thereby conditioned for the performance of functions not obtainable by smooth vitreous surfaces of walls formed in the plates during the manufacture of said plates and before the plates have been thoroughly annealed. Accordingly, these inclined porous walls are in contact with the vitreous non-porous surfaces of the plates. These inclined porous walls will form a strong bond with pointing material and will support the pointing material indefinitely, which non-porous vitreous surfaces will not do. The term "porous surface" as used herein is intended to define a rough-cut surface which may not have all the characteristics of porosity as commonly understood but which is characterized by the presence of a number of small interstices which produce a bonding surface for the pointing material applied thereto.

The nature and purpose of this invention and the foregoing and other advantages and objects thereof will be made apparent from the following description, reference being made to the accompanying drawings, in which—

Fig. 3 is a plan view of one of the structural glass plates of convenient size for use in the practice of this invention.

Fig. 4 is an end elevation of the plate shown in Fig. 3.

Fig. 5 is a side edge elevation of said plate.

Fig. 6 is a perspective view of a portion of one of the plates showing the intersection of the transverse inclined porous walls with the inclined porous wall along one of the corners of the plate.

Fig. 7 is a side edge elevation of the plate portion shown in Fig. 6 having the pointing material filling the space between the inclined porous walls in the body of the plate.

Fig. 8 is an enlarged perspective view of one end of a portion of one of the plates of structural glass constructed in accordance with this invention.

Fig. 9 is an enlarged sectional view on the line 9—9 of Fig. 6 showing, in a magnified manner, the porous surfaces formed to obtain bonding surfaces for the pointing material.

The wall shown surfaced by my improved structural glass plates is of conventional construction, including plaster 1 supported by laths 2 and in turn supporting quantities of mastic cement 3. The structural glass plates are assembled in their proper relationship against the mastic cement 3 while said cement is in a plastic condition in order to obtain a bonding union with the cement.

The structural glass plates are formed in convenient sizes and are cut or sawed, after having been annealed in the manufacture thereof, to form porous side and end edges 4.

Figure 1:
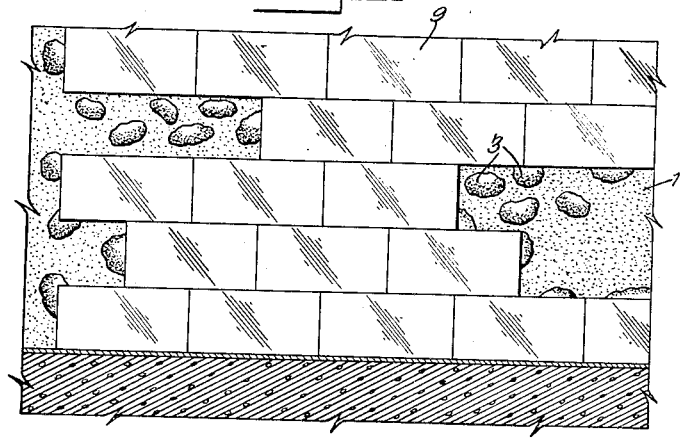
Fig. 1 is an elevation of a portion of a completed structural glass wall erected in accordance with and embodying the present invention.
Figure 2:
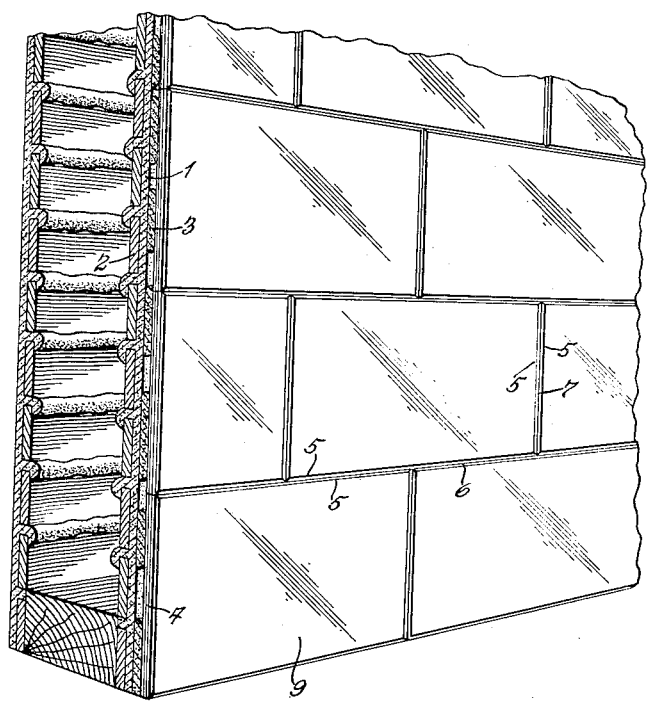
Fig. 2 is an enlarged perspective view of a portion of the wall showing more clearly the inclined porous walls in and along the body of the glass plates before pointing material has been applied.

The outer corners of the respective plates are also cut or sawed to provide porous inclined walls 5. These walls 5 extend along the sides and ends of the plates, so that when the plates are brought together in endwise or edgewise relationship, as shown in Fig. 2, the inclined walls 5 on adjacent plates diverge, forming longitudinal spaces 6 and vertical spaces 7 designed and adapted to receive, hold and form a bond with appropriate pointing material of any desired color or tint.

The lines 8 along which the walls 5 intersect the walls 4 are spaced inwardly from the outer vitreous surface 9 of the annealed glass plate only the distance necessary to provide walls 5 of the desired width. This leaves the porous walls 4 of relatively considerable width in abutting contact.

These plates are also incised, after having been annealed to form diverging porous walls 10 which intersect approximately at the lines 8, so as to provide spaces 11 of approximately the same depth as the spaces 6 and 7 and having porous walls. These spaces are designed and adapted to receive and hold and to form a bond with appropriate pointing material 12 of any desired color or tint. The pointing material 12 in the spaces 11 unites or connects with the pointing material in the spaces 6 so as to produce any desired pattern or design.

The surfaces of the plates opposite from the vitreous exposed surface 9 are formed with grooves or irregularities 13 in order to obtain and hold engagement with the mastic cement 3.

By use and practice of this invention, a wall may be erected faster and more accurately than by ordinary procedure and the labor cost is considerably reduced while, at the same time, a sanitary construction is obtained that has a desirable and pleasing appearance. The completed wall with the pointing material in the spaces having the porous walls gives the appearance of individual glass plates. The porous walls 5 and 10 may be formed by use of any appropriate devices or means, and said walls may be formed in patterns or any desired arrangement.

I claim:

1. Structural glass of the character described comprising a plate of glass having a smooth outer surface, inclined rough cut walls to define spaces in said surface and rough cut walls at the outer edges of said plate, said walls serving as a bonding surface for pointing material.

2. Structural glass of the character described comprising a plate of glass having a smooth outer surface and inclined rough cut walls to define spaces in said surface, said walls serving as bonding surface for pointing material.

3. Structural glass of the character described comprising a plate of glass having a smooth outer surface and beveled outer edges to provide vertical and inclined edges for said plate, said edges being rough cut to provide a bonding surface for pointing material.

WILLIS D. HADLEY.